United States Patent [19]

Saruwatari

[11] Patent Number: 4,521,059
[45] Date of Patent: Jun. 4, 1985

[54] DUAL WHEEL ADAPTER

[75] Inventor: Minoru Saruwatari, Calgary, Canada

[73] Assignee: Qsine Corporation Limited, Calgary, Canada

[21] Appl. No.: 473,493

[22] Filed: Mar. 9, 1983

[30] Foreign Application Priority Data

Mar. 9, 1982 [CA] Canada .................................. 397899

[51] Int. Cl.³ ........................ B60B 11/00; B60B 37/00
[52] U.S. Cl. ................................. 301/36 R; 301/40 S
[58] Field of Search ............. 301/13 R, 13 SM, 36 R, 301/36 A, 40 S, 52, 122, 112

[56] References Cited

U.S. PATENT DOCUMENTS 1,904,081  4/1933  Pratt ................................. 301/36 R

FOREIGN PATENT DOCUMENTS 278150   2/1928  Canada .
441472   5/1947  Canada .
483687   6/1952  Canada .
559478   7/1958  Canada .
1048576  2/1979  Canada .

Primary Examiner—David A. Scherbel
Assistant Examiner—Dennis Rodgers
Attorney, Agent, or Firm—Jones, Tullar & Cooper

[57] ABSTRACT

An adapter for mounting dual wheels on small trucks normally equipped with single wheels, including a spacer assembly connected by elongated studs which thread onto the conventional wheel studs projecting axially from the hub flange. The elongated studs secure the spacer assembly to the flange and have outer ends projecting axially outwardly from the spacer assembly and receive wheel nuts which secure dual rims to the outer end of the spacer assembly. The adapter is easily mounted and ensures a coaxial relationship with the hub flange. The rims may be changed without removing or disturbing the spacer assembly.

12 Claims, 4 Drawing Figures 4,521,059

DUAL WHEEL ADAPTER

BACKGROUND OF THE INVENTION

1. Field of the Invention

This invention relates to a dual wheel adapter, and more particularly, to a device which can be used with the conventional hub of a small truck, such as a pick-up truck, to enable the mounting of a pair of rims.

2. Description of the Prior Art

It has now become a common practice for owners of pick-up trucks to modify the rear wheels for better off-road travel and better traction and also for appearance purposes by replacing the single rear wheel by dual wheels. Adapter kits have been produced, often on a custom basis, for mounting the dual wheels, but generally problems have developed because of lack of secure attachment and lack of concentric mounting on the hub which results in severe imbalance and fracture due to high stresses. Some of the adapters which have been developed are complex and thus costly, while others are difficult to mount and/or must be removed when it becomes necessary to change the rim and/or tire.

BRIEF SUMMARY OF THE INVENTION

According to the present invention there is provided an adapter including a spacer means having an integral body providing opposite inner and outer radial end surfaces, the inner one of which engages with the end face provided by the flange of a vehicle wheel hub. The body has a plurality of axial openings extending between the end faces and arranged to align with the conventional studs extending axially from the flange end face. Each opening has an inner end of reduced diameter to closely receive the conventional stud and also has an enlarged portion extending from a seat between the reduced and enlarged portion to the outer radially surface. A plurality of elongated studs are provided which have in an inner end thereof, an axial bore for threaded engagement with the conventional studs and also have seats for engagement with the seats in the openings when the elongated studs are threaded onto the conventional studs so that the body is secured to the hub flange. The elongated studs have outer ends which project outwardly beyond the outer end surface of the body. A second body has a plurality of openings aligned with the openings in the integral body so it may be slid over the projecting studs, the second body having an inner radial surface for engagement with the outer radial end surface of the integral body and an outer radial surface for mating engagement with the inner one of the dual wheels. These wheels are clamped between securing means on the outer ends of the studs and the outer radial surface of the second body.

It is an object of this invention to provide a dual wheel adapter which is versatile and yet provides a rigid and strong mounting of the wheels.

BRIEF DESCRIPTION OF THE DRAWINGS

Referring now to the accompanying drawings which show a specific embodiment of the invention.

DESCRIPTION OF THE PREFERRED EMBODIMENT

Figure 1:
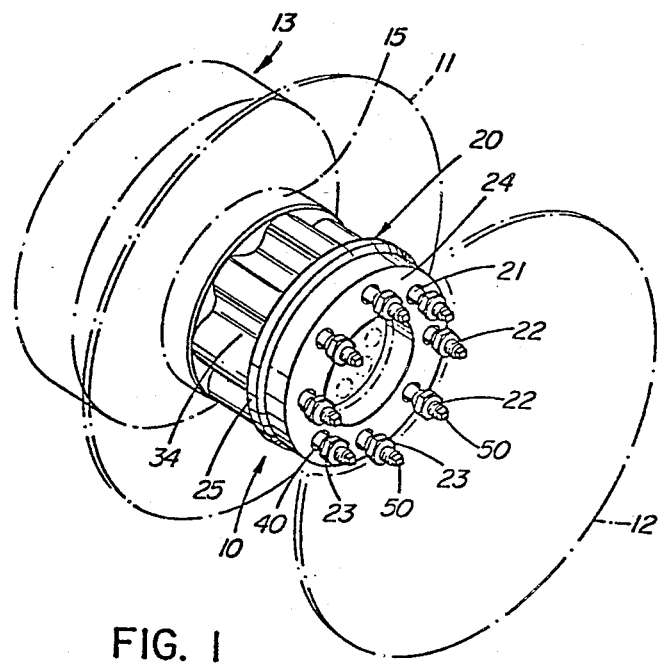
FIG. 1 is a perspective view of the adapter of the present invention with the conventional vehicle rear wheel hub and dual rims shown in phantom.
Figure 2:
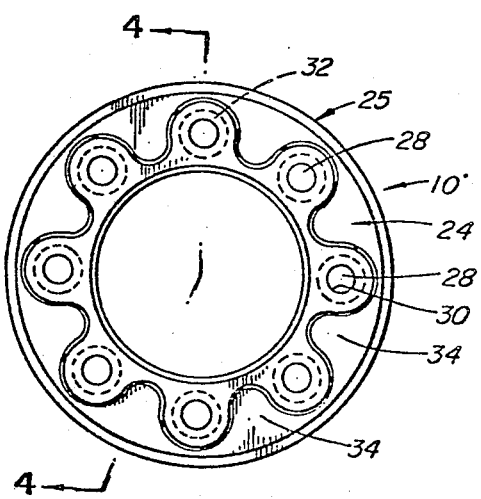
FIG. 2 is an inner end view of the adapter of FIG. 1.
Figure 3:
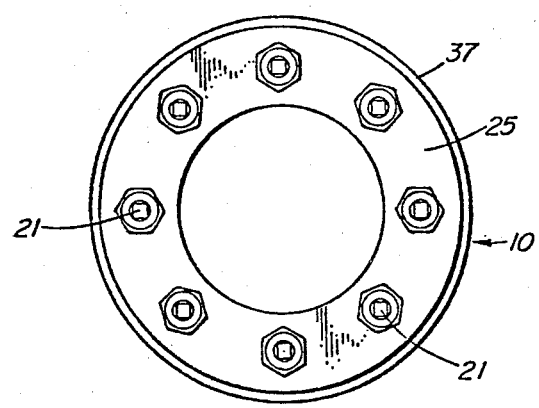
FIG. 3 is an outer end view of the adapter of FIG. 1.

The dual wheel adapter of the present invention is generally denoted by the reference number 10 and has been developed to mount a pair of dual wheel rims 11 and 12 on a conventional hub assembly 13 of a small truck, such as a pick-up or van which would normally be equipped at the factory with two single rear wheels. The hub assembly 13, which is at the outer end of each rear drive axle (not shown), includes a flange 15 providing an annular end face 16 with conventional studs 17 projecting axially from the end face 16. The studs 17 are externally threaded for receiving standard wheel nuts, and normally the single wheel rim, which has stud receiving openings aligned with the studs 17, is fitted over the studs and clamped against the face 16 with the wheel nuts which are threaded onto the studs 17.

The adapter 10 includes spacer means 20, and a plurality of elongated studs 21, which equal the number of conventional studs 17, shown as eight in number in the illustrated example. As will be described in more detail below, the elongated studs have externally threaded outer ends 22, and when the adapter is installed the dual wheel rims are secured between the outer end of the spacer means 20 and wheel nuts 23 tightened onto the ends of the elongated studs 21. The diameter of the threaded outer end of the elongated studs 21 as well as the threads thereon may be the same as the conventional studs 17 so that the same wheel nuts may be used. Because of the different configuration of the special rims which are commercially available for dual mounting, it is in many instances necessary to utilize special wheel nuts.

The dual rims 11,12 have a central portion 11' and 12' which are axially offset from the outer tire supporting portion, the central portion 11' being offset in the opposite direction of 12' so that the tires of rims 11 and 12 are located axially inwardly and outwardly, respectively from the plane of the central portions. Thus, in order to provide sufficient space for the tire of the innermost rim 11 it is necessary to locate the central portions 11', 12' considerably outwardly from the normal location of the rim discussed above, this spacing of the central portion outwardly being accomplished by the spacer means 20, which will now be described in more detail.

Figure 4:
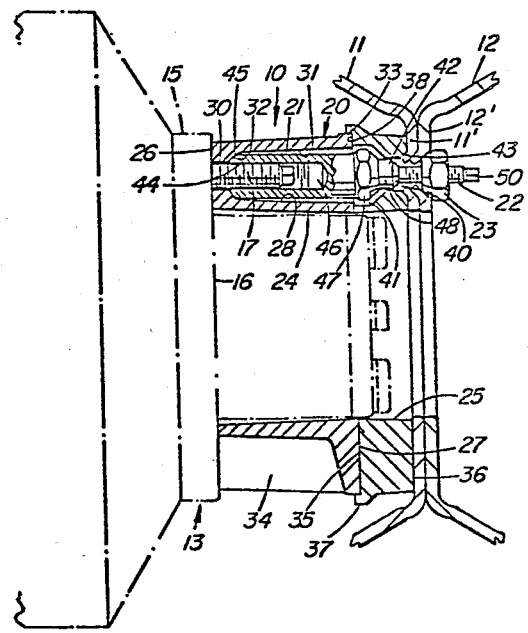
FIG. 4, is a cross-sectional view of the adapter taken along the line 4—4 of FIG. 2.

The spacer means 20 includes members 24 and 25, both of which may be formed as integral cast bodies. The member 24 is of a generally hollow cylinder configuration while member 25 is more of an annulus. The member 24 has an inner radial end surface 26 and an outer radial end surface 27. The end surface 26 engages end face 16 of the flange 15 when the adapter is installed. A plurality of openings 28 extend axially between surfaces 26 and 27 and are arranged to align with the studs 17. Adjacent the inner surface 26 the openings have a reduced portion 30 which closely receive studs 17 so as to accurately center the member 24. The outer portion 31 of each opening 28 outwardly of the reduced portion 30 is enlarged, the outer enlarged portion being separated from the reduced portion 30 by a conical seat 32. The outer surface 27, which is annular, is preferably machined or otherwise finished as is the cylindrical surface 33 (FIG. 4) immediately adjacent the outer end surface 27. The outer part of the member 24 may be relieved between the portion thereof containing the openings 28 as shown at 34 so as to reduce the weight of the member.

The member 25 is of a general annular configuration and an inner radial surface 35 and an outer radial surface 36, the surface 35, which is annular corresponding to surface 27, has outwardly thereof a short cylindrical lip 37 having an inner cylindrical surface 38 sized to closely receive surface 33. Both annular surface 35 and cylindrical surface 38 also preferably are machined or otherwise finished. Although the surfaces 27 and 33 and surfaces 35 and 38 are described as being machined or otherwise finished, it is to be understood that finished is meant to include fine and accurate surfaces which may be achieved in the casting processes, such as by investment casting or pressure die casting, and not necessarily by a finishing step subsequent to casting.

The member 25 has a plurality of openings 40 extending axially between end surfaces 35 and 36 and aligned with openings 28. Each opening has an enlarged portion 41 adjacent the surface 35, and outwardly of the enlarged portion is a portion 42 of circular cross-section of a selected diameter. Between portion 42 and the outer end surface 36, the openings form a conical seat 43.

The elongated studs 21 are provided at their inner ends 44 with a tapered surface 45 for engagement with seat 32. A bore 46 extends axially inwardly from the inner end 44 and is threaded for receiving one of the studs 17. Between the externally threaded outer end 22 of each elongated stud 21 and the inner end 44 there is provided a bolt head portion 47 which is shown as a hex type and which may be of the same size as the wheel nuts 23. A cylindrical portion 48 is provided on stud 21 outwardly of the bolt head portion. The distance between the bolt head portion 47 and the inner end 44 is slightly greater in length than the length of the enlarged portion 31 of the openings 28 so that when the elongated studs 21 are tightened onto the conventional studs 17 and the engagement of the tapered surface 45 bears against the seat 32 to thereby clamp the member 24 against the flange 15, the bolt head portion 47 is slightly outward from the outer surface 27 of the member 24. The enlarged portion 41 of the opening 40 is sufficiently large to receive the bolt head portion 47 when the member 25 is moved into the position where surface 35 engages surface 27. The portion 42 of the opening 40 is sized to closely receive cylindrical portion 48 of the elongated stud 21, with the threaded outer end 22, which is of smaller diameter than the portion 48, extending beyond the outer surface 36 of the member 25. Extending even beyond the threaded outer end of the elongated stud 21 is another bolt head section 50, which may be square and is of smaller cross-section than the immediately adjacent thread portion.

To convert a vehicle to the dual wheel arrangement the existing single wheel is removed in the usual manner by removing the wheel nuts. The member 24 of the spacer means 20 is slid over the conventional studs 17 and because of the close fit between the studs 17 and the reduced portions 30 of the openings 28, the member is concentrically disposed relative to the center line of the flange 15, and the centering of the member is maintained as the elongated studs are tightened onto the studs 17 due to the engagement of tapered surfaces 45 against the seats 32 in the openings 28. The elongated studs 21 are tightened by using a wrench on the bolt head portion 47, after which the member 25 is moved into position. The member 25 is maintained coaxial with member 24 due to the close fit of inner surface 38 over surface 33 and the reception of portions 48 of elongated studs 21 within the portions 42 of openings 40. In the embodiment shown, the pair of rims 11,12 are then positioned over the outer ends of the elongated studs 21 with inturned portions immediately surrounding the stud openings of the rims moving into the conical seat 43 of the openings 40 in member 25. The wheel nuts 23 are then tightened on to the threaded outer ends of the elongated studs 21 with the tapered portion of the nuts pushing into the tapered recess provided by the inturned portions around the stud openings of the rims.

In view of the different types of dual wheel rims which are available, the member 25 and the wheel nuts 23 may be of somewhat different configuration. For example, in some rims only every alternate hole has an inturned portion about the stud openings with every other opening having an out-turned portion. The member 25 is then similarly designed at the outer end of the openings 40. Another form of dual rims has stud openings having no inturned or out-turned portions about the stud openings but is utilized with an additional external ring outside of the rims and against which the wheel nuts bear. With this latter arrangement, the openings 40 of the member 25 need not be provided with the tapered surface 45.

As may be observed from the above, the converting of the vehicle to a dual wheel arrangement can be carried out quickly without special tools and the mounting of the wheels coaxial with the center line of rotation is ensured by the mating relationship of the parts as described above. In the event it becomes necessary to remove a rim, for example, to change a tire, the wheel nuts need only be removed, the spacer means 20 remaining undisturbed. In the event the elongated stud 21 turns when a wheel nut is being loosened, it is possible to hold the elongated stud by placing a wrench on the bolt head 50 as the wheel nut is turned, thus ensuring that the member 24 remains secured to the hub flange 15.

By utilizing casting parts for members 24 and 25, strength is ensured and production costs are low with only a minimum of simple machining required, it being apparent from the shape of these major components of the adapter that they are of a type which can be readily casted with the use of a minimum amount of material.

Although only one embodiment has been illustrated, various modifications would be obvious to those skilled in the art without departing from the spirit of the invention as defined in the appending claims.

I claim:

1. An adapter for mounting dual wheels on a vehicle hub having a flange with an annular end face and a plurality of threaded studs projecting from said face, said adapter comprising spacer means including an integral first body having an inner radial end surface for engagement with the end face of said flange and an opposite outer radial end surface, a second body having an inner radial surface engageable with the outer radial end surface of said first body, said first body having a plurality of openings arranged for alignment with said studs and extending axially between the opposite end surfaces thereof, each of said openings having an inner reduced portion of reduced diameter to closely receive one of said studs and an enlarged outer portion extending from said reduced portion to said outer end surface, a seat being provided in each opening between the reduced and enlarged portions, said second body having an outer radial surface for engagement by an inner one of the dual wheels and further having a plurality of openings extending axially from said inner radial surface to said outer radial surface thereof and being aligned with said openings of said first body, a plurality of elongated studs having at an inner end thereof an axial bore for threaded engagement with the studs of the vehicle hub, said elongated studs each having a seat for engagement with said seat in said opening when threaded on the hub stud and an outer end extending outwardly beyond said outer radial end surface of said first body a distance greater than the thickness of said second body, and securing means engageable with the outer ends of said elongated studs for clamping the dual wheels against said second body.

2. An adapter as defined in claim 1, wherein each elongated stud includes a bolt head portion inwardly of the outer threaded end, the distance between said seat and said bolt head portion of said elongated stud being greater than the length of said enlarged portion of the opening in said first body whereby said bolt head portion is disposed outwardly of said outer end surface of said first body when said elongated studs are threaded onto the hub studs, said openings of said second body having enlarged portions adjacent said inner radial surface thereof for reception of said bolt head portion of said elongated stud.

3. An adapter as defined in claim 2, wherein said elongated studs include a portion of circular cross-section intermediate said bolt head portion and an outer threaded end, and wherein said openings of said second body include a portion extending outwardly from said enlarged portion to said outer radial surface for close reception of the intermediate portion of said elongated studs.

4. An adapter of claim 3 wherein the first body is of a generally hollow cylindrical shape and said second body is of a generally annular configuration.

5. An adapter as defined in claim 2, wherein said outer radial surface of the first body member and the inner radial surface of said second body are engaging finished annular surfaces.

6. An adapter as defined in claim 5 wherein the first body member has a finished outer cylindrical surface immediately adjacent the finished annular surface thereof, and wherein said second body member has an axially projecting annular lip immediately outward of the radially inner radial surface thereof, said annular lip having a finished inner cylindrical surface for closely receiving the finished outer cylindrical surface of the first body.

7. An adapter for mounting dual wheels on a vehicle hub having a flange with an annular end face and a plurality of threaded studs projecting from said face, said adapter comprising spacer means including an integral body having an inner radial end surface for engagement with the end face of said flange and an opposite outer radial end surface, said body having a plurality of openings arranged for alignment with said studs and extending axially between said opposite end surfaces thereof, each of said openings having an inner reduced portion of reduced diameter to closely receive one of said studs and an enlarged outer portion extending from said reduced portion to said outer end surface, a seat being provided in each opening between the reduced and enlarged portions, a plurality of elongated studs having at an inner end thereof an axial bore for threaded engagement with the studs of the vehicle hub, said elongated studs each having a seat for engagement with said seat in said opening when threaded on the hub stud and an outer end extending outwardly beyond said outer end surface of said body, said outer ends of said elongated studs being externally threaded for receiving clamping nuts seated against an outer one of said dual wheels having openings aligned with and receiving the outer ends of said elongated studs for clamping the dual wheels outwardly of said spacer means, each elongated stud including a bolt head portion inwardly of the outer threaded end, the distance between said seat and said bolt head portion of said elongated stud being greater than the length of said enlarged portion of the opening in said body whereby said bolt head portion is disposed outwardly of said outer end surface of said body when said elongated studs are threaded onto the hub studs, and wherein said spacer means further includes a second body having an inner radial surface and an outer radial surface and a plurality of openings extending axially from said inner to said outer radial surface thereof and being aligned with said openings of the first body, said openings of said second body having enlarged portions adjacent said inner radial surface thereof for reception of said bolt head portion of said elongated stud.

8. An adapter as defined in claim 7, wherein said elongated studs include a portion of circular cross-section intermediate said bolt head portion and the outer threaded end, and wherein said openings of said second body include a portion extending outwardly from said enlarged portion to said outer radial surface for close reception of the intermediate portion of said elongated studs.

9. An adapter of claim 7 wherein the first body is of a generally hollow cylindrical shape and said second body is of a generally annular configuration.

10. An adapter as defined in claim 7, wherein said outer radial surface of the first body member and the inner radial surface of said second body are engaging finished annular surfaces.

11. An adapter as defined in claim 10 wherein the first body member has a finished outer cylindrical surface immediately adjacent the finished annular surface thereof, and wherein said second body member has a axially projecting annular lip immediately outward of the radially inner radial surface thereof, said annular lip having a finished inner cylindrical surface for closely receiving the finished outer cylindrical surface of the first body.

12. A dual wheel mounting device for use on a vehicle hub having a flange with an annular end face and a plurality of threaded studs projecting axially from said face, said adapter comprising a spacer means including an integral first body having an inner radial end surface for engagement with said end face of said vehicle hub and an opposite outer radial end surface, said first body having a plurality of openings extending axially between said end surfaces for alignment with the studs of said hub, each of said openings having an inner reduced portion of reduced diameter to closely receive one of said studs and an enlarged outer portion extending from said reduced portion to said outer end surface, a seat being provided at the juncture of said reduced and enlarged portions in each opening, and a second body having an inner radial surface for engagement with the outer end surface of said first body and an outer wheel engaging surface, said second body being formed with a plurality of openings extending axially between said inner surface and said outer surfaces thereof, said plurality of openings being alignable with the openings of said first body; and a plurality of elongated studs each comprising a threaded axial bore at the inner end thereof for mating engagement with the studs of said hub, a seat for engagement with said seat in the opening of said first body when threaded onto the stud of the hub, and an outer threaded male end extending outwardly through the openings of said second body member for receiving wheel clamping nuts.

* * * * *